(12) United States Patent
Chen

(10) Patent No.: US 9,701,836 B2
(45) Date of Patent: Jul. 11, 2017

(54) AQUEOUS EMULSION RESIN FOR PRODUCING MEMORY FOAM AND METHOD FOR MANUFACTURING MEMORY FOAM PRODUCT

(71) Applicant: Isotech Products Incorporated, Jubei, HsinChu (TW)

(72) Inventor: Yu-Ting Chen, Jhubei (TW)

(73) Assignee: Isotech Products Incorporated, Hsinchu (TW)

( * ) Notice: Subject to any disclaimer, the term of this patent is extended or adjusted under 35 U.S.C. 154(b) by 1144 days.

(21) Appl. No.: 13/684,413

(22) Filed: Nov. 23, 2012

(65) Prior Publication Data

US 2014/0145363 A1    May 29, 2014

(51) Int. Cl.
| | |
|---|---|
| *B29C 65/00* | (2006.01) |
| *C08L 75/04* | (2006.01) |
| *C08G 18/48* | (2006.01) |
| *C08G 18/10* | (2006.01) |
| *B29C 44/02* | (2006.01) |
| *C08G 101/00* | (2006.01) |

(52) U.S. Cl.
CPC .............. *C08L 75/04* (2013.01); *B29C 44/02* (2013.01); *C08G 18/10* (2013.01); *C08G 18/4837* (2013.01); *C08G 2101/00* (2013.01); *C08G 2280/00* (2013.01)

(58) Field of Classification Search
CPC .... B29C 44/02; C08G 18/10; C08G 18/4837; C08L 75/04
See application file for complete search history.

(56) References Cited

U.S. PATENT DOCUMENTS

| | | | | |
|---|---|---|---|---|
| 2006/0270747 A1* | 11/2006 | Griggs | ................... | C08G 18/36 521/172 |
| 2009/0306237 A1* | 12/2009 | Babb | ................... | C08G 18/165 521/156 |

* cited by examiner

*Primary Examiner* — Joseph S Del Sole
*Assistant Examiner* — John Robitaille
(74) *Attorney, Agent, or Firm* — Muncy, Geissler, Olds & Lowe, P.C.

(57) ABSTRACT

An aqueous emulsion resin for producing memory foam and a method for manufacturing memory foam products are revealed. The emulsion resin mainly includes 38~58% hydrophilic polyurethane(PU) prepolymer, 8~22% aqueous emulsion polymer and 8~20% polyether polyol. The PU prepolymer includes 40~70% polyether polyol and 30~60% isocyanate while the molecular weight of polyether polyol is ranging from 60 to 1800. The polyether polyol contains at least 40 mol % amount of ether group and the amount of ether group is 18~99.9%. The hydrophilic emulsion resin features on good vibration absorption, even pressure relief, moisture absorption, heat absorption, and low temperature resistance. While in contact with bodies, users feel cool and dry. Moreover, the resin will not become rigid at the temperature lower than 10° C. The comfort of the foam is improved and the applications of the foam are increased.

11 Claims, No Drawings

AQUEOUS EMULSION RESIN FOR PRODUCING MEMORY FOAM AND METHOD FOR MANUFACTURING MEMORY FOAM PRODUCT

BACKGROUND OF THE INVENTION

The present invention relates to an aqueous emulsion resin for producing memory foam and a method for manufacturing memory foam products, especially to a hydrophilic EVA (ethylene-vinyl acetate) memory foam made from aqueous emulsion resin with good vibration absorption, even pressure distribution and pressure relief, moisture absorption, heat absorption, low temperature resistance and non-toxicity, and a manufacturing method thereof.

Generally, polyurethane (PU) foam has been widely used in various products such as pillows, medical mattresses, office chair cushions, bed mattresses or shoe materials. Now PU memory foam with uniform pressure relief is available on the market. The PU memory foam is made from a mixture of polyether polyol (0.5~90%), isocyanate (2~60%) and acrylic resin (0.5~50%). The above materials are mixed evenly at room temperature and then is added with carbon dioxide ($CO_2$) produced by reaction of water or other foaming agents with low volatility such as methylene chloride ($CH_2Cl_2$). Next pour the mixture into a mold for various products including pillows, medical mattresses, office chair cushions, bed mattresses or shoe materials. The temperature is controlled between 30° C.~50° C. and the foaming time is 5-10 minutes to produce molded foam. Some years ago, American company Frisby has ever used heat absorption particles (a kind of microencapsulated particle) as a filler of the foam to produce fabrics and hydrophilic (porous) foam with insulating and cooling effects. The foam is applied to various products such as home furnishing or medical beds. However, the foam and integral skin foam added with the microencapsulated particles don't have obvious temperature control effect. Sometimes there is even no difference between these foam and those without the microencapsulated particles. The PU memory foam available now has following disadvantages:

<1> The conventional PU memory foam is hydrophobic so that it has poor moisture absorption property and heat absorption property. While in contact with users' skin, the moisture and heat generated by the users are unable to be dissipated. Thus heat is accumulated in the contact area quite fast and the users are hot and sweltering. This has negative effects on the applications of the foam.

<2> Although the PU memory foam is soft and flexible, it doesn't have low temperature resistance. Due to high temperature sensitivity, the PU memory foam is getting rigid when the temperature is lower than 10° C. Once the ambient temperature is lower than 5° C., the PU memory foam is as hard as wood. Thus the temperature must be increased to a certain degrees and the memory foam will become flexible while being used in cold places. There is restriction on the ambient temperature and the applications of the memory foam are also affected.

<3> The service life of the memory foam is under influence of the poor oxidation resistance and poor hydrolysis resistance.

<4> After the reaction completed, there is still a lot of TDA (Toluene diamine) or MDA (methylene diphenyl diamine) residual in the conventional hydrophobic PU foam so that the foam is toxic while the residual amine catalyst in the molded foam causes an unpleasant order. Both affects the use of pillows, mattresses and cushions. Moreover, the conventional foam is not durable, easy to be oxidized or reacted with perfume, alcohols to become powder.

Thus there is room for improvement and a need to provide novel memory foam that meets user's requirements on quality, functions and comfort.

SUMMARY OF THE INVENTION

Therefore it is a primary object of the present invention to provide an aqueous emulsion resin for producing memory foam and a method for manufacturing memory foam that features on vibration absorption, even pressure distribution and pressure relief, moisture absorption, thermo absorption due to specific hydrophilic polymer structure or polymer backbone. Thus while in contact with humans bodies, the memory foam provides dry and cool effect. Therefore the PU foam is more comfortable and having broader applications.

It is another object of the present invention to provide an aqueous emulsion resin for producing memory foam. The memory foam is EVA memory foam with moisture absorbing property and thermal absorbing property. Moreover, the memory foam also has low temperature resistance due to the composite so that it will not cure at the temperature lower than 10° C. Thus the ambient temperature of the EVA foam is increased.

It is a further object of the present invention to provide an aqueous emulsion resin for producing memory foam that is non-order and non-toxic because there is no residual isocyanate in the foam. During the manufacturing processes, only carbon dioxide produced by isocyanate reacting with a lot of water is used as a foaming agent and there is no need to use other foaming agents. In conventional EVA memory foam made from non-aqueous emulsion, there is residual amine catalyst besides a lot amount of TDA or MDA so that the memory foam has an unpleasant order. This has negative effects on the application range, comfort and safety.

It is a further object of the present invention to provide an aqueous emulsion resin for producing memory foam that not only includes the above materials but also has fillers such as heat absorbing particles. The heat absorbing particle is a microencapsulated particle with specific melting point and the weight percent of the heat absorbing particles added is ranging from 0% to 20%. The heat absorbing particles have physical actions in the foam to improve temperature control of the foam.

It is a further object of the present invention to provide a method for manufacturing memory foam by using aqueous emulsion resin in which a product produced by the above materials after being foamed and molded is further treated by a high temperature (50~100°) baking step for dehydration. Thus the manufacturing processes of EVA foam are completed.

In order to achieve the above objects, an aqueous emulsion resin for producing memory foam of the present invention includes 5~70 weight percent of hydrophilic polyurethane(PU) prepolymer, 1-50 weight percent of aqueous emulsion polymer (such as ethylene vinyl acetate emulsion), and 1-50 weight percent of polyether polyol while the preferred weight percentage is 38-58 weight percent of aqueous PU dispersion, 8-22weight percent of aqueous emulsion polymer, and 8-20 weight percent of polyether polyol. The PU prepolymer consists of 1~80 weight percent of polyether polyol and 1~70 weight percent of isocyanate while 40~70 weight percent of polyether polyol and 30~60 weight percent of isocyanate are preferred. The molecular weight of the polyether polyol contained in PU prepolymer is ranging from 60 to 1800 and the polyether polyol has at least 40 mol % of ether group (-EO-). The weight percent of the ether group (-EO-) is 18~99.9%. The carbon dioxide generated by isocyanate reacted with a large amount of water is used as an only foaming agent and there is no need to use other foaming agent. After a foaming process, memory foam is produced.

DETAILED DESCRIPTION OF THE PREFERRED EMBODIMENT

The aqueous emulsion resin used to produce memory foam features on that it includes 5~70 weight percent of aqueous Polyurethane(PU) dispersion, 1-50 weight percent of aqueous emulsion polymer (such as ethylene vinyl acetate emulsion), and 1-50 weight percent of polyether polyol while the preferred weight percentage is 38-58 weight percent of aqueous PU dispersion, 8-22 weight percent of aqueous emulsion polymer, and 8-20 weight percent of polyether polyol. The aqueous PU dispersion (PU prepolymer) contains 1~80 weight percent of polyether polyol and 1~70 weight percent of isocyanate while the optimal weight percent of polyether polyol is 40~70 and the optimal weight percent of isocyanate is 30~60. The molecular weight of the polyether polyol contained in PU prepolymer is ranging from 60 to 1800 and the polyether polyol has at least 40 mol % of ether group. The weight percent of ether is 18~99.9%. Carbon dioxide ($CO_2$) generated by isocyanate reacted with a lot amount of water is used as a foaming agent and there is no need to use other foaming agent. After expanded foaming, the above materials in a product mold are foamed and produced into products. The molded products is treated by a high temperature (50~100° C.) baking process for dehydration. The manufacturing processes of the memory foam made from aqueous emulsion resin are completed.

The isocyanate used can be TDI (Toluene Diisocyanate), MDI (Methylene Diphenyl Diisocyanate), IPDI (Isophorone Diisocyanate), or their mixture. Then the isocyanate is reacted with polyether polyol to produce the aqueous emulsion polymer (such as ethylene vinyl acetate emulsion) mentioned above. The molecular weight of polyether polyol is ranging from 200 to 2000 while 500 to 1500 is preferred. The amount of ether group (-EO-) contained in the polyether polyol is ranging from 20 to 99.9%.

In practice, the aqueous emulsion resin can also be produced into memory foam by one shot technique. Without manufacturing prepolymer, the isocyanate and polyether polyol for preparing prepolymer is mixed in certain I/P ratio and set into a mold to be reacted, foamed and molded. I represents the weight of hydrophilic PU prepolymer while P is total weight of aqueous emulsion polymer and polyether polyol.

The above aqueous emulsion polymer is not limited to ethylene vinyl acetate emulsion. It can also be obtained by polymerization of acrylic, vinyl acrylic or styrene acrylic.

Based on the above memory foam composition, the followings are embodiments of memory foam with different composition and their physical properties including flexibility, recovery time, low temperature resistance or the scope of products. The prepolymer in these embodiments is synthesized by toluene diisocyanate (TDI) reacted with polyol.

Embodiment One
<Composition>

| Weight unit | | Weight percent (%) |
|---|---|---|
| Water ($H_2O$) | 19.6 | 32.67 |
| EVA emulsion (polymer) | 10 | 16.67 |
| Surfactant B | 0.4 | 0.67 |
| PU prepolymer | 30 | 50 |
| Total | 60 | 100 |

The surfactant B can be Pluronic 61, Pluronic 62, Pluronic 64 or Pluronic 101 (products of Germany chemical company BASF), LK443, DC-198, DC504 (products of US company AIR PRODUCTS), LH525, LK260 (products of Germany company TH. Goldschmidt), etc.

<Features>

The foam has stronger tensile strength and tear resistance, moisture absorption, heat absorption and the recovery time is 1-5 seconds. The application scope of the product: pillow, medical mattress, office chair cushion, bed mattress, or shoe material while the main applications are shoe materials, cushions and mattresses. The physical properties are shown in the following list:

| | | |
|---|---|---|
| Density (g/cm3) | 0.148 | 0.189 |
| Texture | very delicate and flexible | very delicate and flexible |
| Recovery time (s) | 3 | 2 |
| Air permeability | Good | good |
| Tensile strength ($kg/cm^2$) | 1.44 | 1.47 |
| Elongation (%) | 323 | 390 |
| Tearing strength (kg/cm) | 0.79 | 1.52 |
| *Water Absorbency (wet/dry) | 12 | 7.7 |
| Permanent deformation** (22 hrs/50° C.) | 19.01 | 8.58 |

*Water Absorbency: wetted materials already absorbed with water/dry materials not absorbed with water yet
**Permanent deformation: the specimen is tested by the method B of ASTM D395, compressed 50% for a specified time at a specified temperature.

Embodiment Two
<Composition>

| Weight unit: | | Weight percent (%) |
|---|---|---|
| Water($H_2O$) | 14.6 | 24.33 |
| EVA emulsion (polymer) | 10 | 16.67 |
| Surfactant A | 5 | 8.33 |
| Surfactant B | 0.4 | 0.67 |
| PU prepolymer | 30 | 50 |
| Total | 60 | 100 |

The surfactant A is a Brig 93 (product of ICI America company), or Emulgale 1000 NI (a product of Henktel Company).

<Features>

This embodiment is more flexible than the above one, having moisture absorption, heat absorption and the recovery time is 1-5 seconds. The application scope of the product: pillow, medical mattress, office chair cushion, bed mattress, or shoe material while the main applications are pillows, cushions and mattresses. The physical properties are shown in the following list:

| | |
|---|---|
| Density (g/cm³) | 0.144 |
| Texture | Very delicate and flexible |

| Recovery time (s) | | | | |
|---|---|---|---|---|
| Temperature | 25° C. | 36° C. | 42° C. | 48° C. |
| The number of seconds | 2 | 6 | 15 | 18-20 |

| | |
|---|---|
| Air permeability | Excellent |
| Tensile strength (kg/cm²) | 4.27 |
| Elongation (%) | 304 |
| Tearing strength (kg/cm) | 0.92 |
| Water Absorbency (wet/dry) | 12.6 |

Embodiment Three
<Composition>

| Weight unit: | Weight percent (%) | |
|---|---|---|
| Water (H₂0) | 7 | 12.24 |
| EVA emulsion (polymer) | 7 | 12.24 |
| Surfactant A | 7.1 | 12.42 |
| Surfactant B | 0.14 | 0.24 |
| Amine catalyst I | 0.07 | 0.12 |
| Amine catalyst II | 0.07 | 0.12 |
| Polyether polyol A | 7.21 | 12.62 |
| PU prepolymer | 28.59 | 50 |
| Total | 57.18 | 100 |

The molecular weight of polyether polyol A ranges from 60 to 1800 while 50 to 400 is preferred. The amount of ether group (-EO-) is from 18% to 99.9% while the optimal amount is 50% to 85%. The polyether polyol A can be PEG (polyoxyethylene glycol) 200, PEG 600, a mixture of ethylene glycol, diethylene glycol, and propylene glycol, or a mixture of ethylene glycol, diethylene glycol, and glycerol. The amine catalyst I can be Dabco 33LV, Dabco DMEA (products of American AIR PRODUCTS) while the amine catalyst II can be Dabco BL-11, Dabco BL-19, Dabco BL-22 (products of American AIR PRODUCTS Co.); or ZF-20, ZR-70, or DMP (products of American HUNTSMAN company).

<Features>

This embodiment is more flexible than the embodiment two and having a disadvantage of a little shrinkage. The recovery time is ranging from 1 sec. to 10 sec. The application scope of the product: pillow, medical mattress, office chair cushion, bed mattress, or shoe material while the main applications are pillows, cushions and mattresses.

Embodiment Four
<Composition>

| Weight unit | Weight percent (%) | |
|---|---|---|
| Water | 7 | 10.18 |
| White glue emulsion (PVAC poly vinyl acetate) (aqueous emulsion polymer) | 7 | 10.18 |
| Surfactant A | 10 | 14.50 |
| Surfactant B | 0.14 | 0.2 |
| Amine catalyst I | 0.12 | 0.17 |
| Amine catalyst II | 0.10 | 0.14 |
| Polyether polyol B | 10 | 14.50 |
| PU prepolymer | 34.36 | 50 |
| Total | 68.72 | 100 |

The molecular weight of polyether polyol B ranges from 60 to 1800 while 50 to 400 is preferred. The amount of ether group (-EO-) is from 18% to 99.9% while the optimal amount is 50% to 85%. The polyether polyol B can be PEG 300, a mixture of ethylene glycol, diethylene glycol, and propylene glycol, or a mixture of ethylene glycol, diethylene glycol, and glycerol.

<Features>

The flexibility of this embodiment is the same with the embodiment three but without shrinkage. The deformation rate is low and the recovery time is ranging from 1 sec to 10 sec. The application scope of the product: pillow, medical mattress, office chair cushion, bed mattress, or shoe material while the main applications are pillows, cushions and mattresses. The physical properties are shown in the following list:

| | |
|---|---|
| Density (g/cm³) | 0.145 |
| Flexibility (at-15° C.) | flexible |
| Recovery (s) | 5 ~ 10 |
| Air permeability | Good |
| Tensile strength (kg/cm2) | 0.158 |
| Elongation (% ) | 140 |
| Tearing strength (kg/cm) | 0.315 |
| Water Absorbency * (wet/dry) | 6.3 |

Embodiment Five
<Composition>

| Weight unit | Weight percent (%) | |
|---|---|---|
| Water | 7 | 9.77 |
| Aqueous emulsion polymer | 7 | 9.77 |
| Surfactant A | 7.1 | 9.92 |
| Surfactant B | 0.14 | 0.20 |
| Amine catalyst I | 0.07 | 0.10 |
| Amine catalyst II | 0.07 | 0.10 |
| Polyether Polyol C | 14.42 | 20.14 |
| PU prepolymer | 35.80 | 50 |
| Total | 71.60 | 100 |

The molecular weight of polyether polyol C ranges from 50 to 1000 while 50 to 400 is preferred. The amount of ether group (-EO-) is from 20% to 99.9% while the optimal amount is 50% to 85%. The polyether polyol C can be PEG 400, a mixture of ethylene glycol, diethylene glycol, and propylene glycol, or a mixture of ethylene glycol, diethylene glycol, and glycerol.

<Features>

The flexibility of this embodiment is the same with the embodiment three but without shrinkage. The deformation rate is low and the recovery time is ranging from 1 sec to 10 sec. The application scope of the product: pillow, medical mattress, office chair cushion, bed mattress, or shoe material while the main applications are pillows.

A method for manufacturing memory foam products by aqueous emulsion resin includes following steps.

Step <1> provide polyurethane(PU) prepolymer;

The PU prepolymer contains 1~80 weight percent of polyether polyol and 1~70 weight percent of isocyanate while the optimal weight percent of polyether polyol is 40~70 and the optimal weight percent of isocyanate is 30~60. The molecular weight of the polyether polyol contained in the PU prepolymer is ranging from 60 to 1800 and having at least 40 mol % of ether group (-EO-). The amount of the ether group (-EO-) is 18~99.9%.

Step <2> provide a mold of various products such as pillow, cushion, mattress, or shoe insoles;

Step <3> use 1~70 weight percent of the above PU prepolymer, 1~50 weight percent of aqueous emulsion polymer such as EVA polyethylene vinyl acetate emulsion, and 1~50 weight percent of polyether polyol as main compositions while 40~60 weight percent of the PU prepolymer, 5~20 weight percent of aqueous emulsion polymer, and 5~20 weight percent of polyether polyol is preferred;

The polyether polyol consists of a certain ratio of water, surfactant, amine catalyst and heat absorbing particles. The temperature of the materials is ranging from 5° C. to 50° C. The heat absorbing particles (microencapsulated particles) can be particles encapsulated by melamine resin with a melting point of 28.3° C.

Step <4> mix the above PU prepolymer, polyether polyol, and aqueous emulsion polymer to form a mixture and inject the mixture into the mol;

The mold temperature is controlled between 30° C. to 50° C. to perform a foam forming process. The foaming time is about 5-10 minutes. A ratio of a weight of the PU prepolymer to a total weight of the aqueous emulsion polymer and the polyether polyol is ranging from 3/2 to ⅔ while 1/1 is preferred, as shown in the above embodiments.

Step <5> remove foamed and molded foam from the mold after the foam forming process.

Step <6> set the molded foam into an oven to perform a high temperature baking process.

The temperature of the oven is about 50° C.~100 ° C. while the baking time depends on size and weight of objects being baked, ranging from tens of minutes to several hours. Thus dehydration is achieved and the manufacturing of foam is completed.

In the above manufacturing processes, the PU prepolymer is produced by polyether polyol and isocyanate in a certain ratio as shown in the step <1>. The step <1> and the step <3> can be simplified into a one shot technique. The isocyanate used is TDI (Toluene Diissocyanate) and the polyether polyol used is PEG 600. The TDI, PEG 600, catalysts, surfactants, chain extenders, water and aqueous emulsion polymer are mixed and injected into the mold to be foamed and molded. The manufacturing process (step) of the PU prepolymer can be omitted.

In the above materials, the heat absorbing particles added in polyether polyol are microencapsulated particles. The heat absorbing particles can be added or not, ranging from 0%~20%. Even being added, there is only physical change between the heat absorbing particles and the foam. No chemical structure or bonding occurs between the heat absorbing particles and the foam. Thus the moisture absorption property and heat absorption property of the EVA foam of the present invention are not affected no matter the heat absorbing particles are added or not. The EVA foam keeps users cool and dry.

In summary, the memory foam made from aqueous emulsion resin of the present invention has following advantages compared with conventional memory foam:

<1> The pliable and delicate memory foam of the present invention offers good moisture absorption property and heat absorption property. While in contact with users' skin, the foam absorbs moisture and heat effectively and then dissipates them so as to give users a dry and cool feeling.

<2> The foam is of low temperature resistance and is not too sensitive to the temperature. When the temperature is lower than 10° C., it will not become rigid or hard. Even at −15° C., it is still soft and plicable.

<3> The foam provides pressure relief.

<4> The foam is non-toxic.

<5> The foam has no unpleasant orders and no skin irritations.

The rest is shown in the following table.

| Property | present invention | prior art |
|---|---|---|
| Heat absorption | yes | no |
| Moisture absorption | good | no |
| Flexibility | excellent | a bit rough |
| Temperature sensitivity | a bit or no | obviously becoming harder along with the decreasing temperature |
| Skin irritation | no | yes |
| Comfort | cool and dry | sweltering, uncomfortable |
| Toxicity | no TDA or MDA | large amount of TDA or MDA |
| Unpleasant order | no | strong (due to amine catalyst, etc) |

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An aqueous emulsion resin used as foaming materials for producing memory foam comprising:

38~58 weight percent of polyurethane(PU) prepolymer, 8~22 weight percent of aqueous emulsion polymer, and 8~20 weight percent of polyether polyol;

wherein the polyether polyol includes a certain ratio of water, at least one surfactant, at least one amine catalyst; the PU prepolymer includes 40~70 weight percent of polyether polyol and 30~60 weight percent of isocyanate; the polyether polyol in the PU prepolymer having a molecular weight ranging from 60 to 1800 and at least 40 mol % of ether group (-EO-) while weight percent of the ether group is ranging from 18 to 99.9; the aqueous emulsion resin is passed through carbon dioxide produced by the isocyanate reacting with large amount of water and used as a foaming agent to be foamed and molded;

wherein the polyether polyol further includes 0~20% heat absorbing particles that are microencapsulated particles; and wherein the microencapsulated particles are encapsulated by melamine resin with a melting point of 28.3° C.

2. The resin as claimed in claim 1, wherein the aqueous emulsion resin used as foaming materials includes 32.67 weight percent of water, 16.67 weight percent of the aqueous emulsion polymer, 0.67 weight percent of the surfactant, and 50 weight percent of the PU prepolymer.

3. The resin as claimed in claim 1, wherein the aqueous emulsion resin used as foaming materials includes 12.24 weight percent of water, 12.24 weight percent of the aqueous emulsion polymer, 12.42 weight percent of a first surfactant, 0.24 weight percent of a second surfactant, 0.12 weight percent of a first amine catalyst, 0.12 weight percent of a second amine catalyst, 12.62 weight percent of the polyether polyol and 50 weight percent of the PU prepolymer.

4. The resin as claimed in claim 1, wherein the aqueous emulsion resin used as foaming materials includes 12.24 weight percent of water, 12.24 weight percent of the aqueous emulsion polymer, 12.42 weight percent of a first surfactant, 0.24 weight percent of a second surfactant, 0.12 weight percent of a first amine catalyst, 0.12 weight percent of a second amine catalyst, 12.62 weight percent of the polyether polyol and 50 weight percent of the PU prepolymer.

5. The resin as claimed in claim 4, wherein the polyether polyol having molecular weight ranging from 50 to 400 and 50~85 weight percent of the ether group; the polyether polyol is PEG200, PEG 600, a mixture of ethylene glycol, diethylene glycol, and propylene glycol, or a mixture of ethylene glycol, diethylene glycol, and glycerol.

6. The resin as claimed in claim 1, wherein the aqueous emulsion resin used as foaming materials includes 10.18 weight percent of water, 10.18 weight percent of the aqueous emulsion polymer, 14.50 weight percent of a first surfactant, 0.2 weight percent of a second surfactant, 0.17 weight percent of a first amine catalyst, 0.14 weight percent of a second amine catalyst, 14.50 weight percent of the polyether polyol and 50 weight percent of the PU prepolymer.

7. The resin as claimed in claim 6, wherein the polyether polyol having a molecular weight ranging from 50 to 400 and 50~85 weight percent of the ether group; the olyether polyol is PEG300, a mixture of ethylene glycol, diethylene glycol, and ropylene glycol, or a mixture of ethylene glycol, diethylene glycol, and glycerol.

8. The resin as claimed in claim 1, wherein the aqueous emulsion resin used as foaming materials includes 9.77 weight percent of water, 9.77 weight percent of the aqueous emulsion polymer, 9.92 weight percent of a first surfactant, 0.20 weight percent of a second surfactant, 0.10 weight percent of a first amine catalyst, 0.10 weight percent of a second amine catalyst, 20.14 weight percent of the polyether polyol and 50 weight percent of the PU prepolymer.

9. The resin as claimed in claim 8, wherein the polyether polyol having a molecular weight ranging from 50 to 400 and 50~85 weight percent of the ether group; the polyether polyol is PEG400, a mixture of ethylene glycol, diethylene glycol, and propylene glycol, or a mixture of ethylene glycol, diethylene glycol, and glycerol.

10. The resin as claimed in claim 1, wherein the aqueous emulsion resin used as foaming materials includes 11.51 weight percent of water, 11.51 weight percent of the aqueous emulsion polymer, 11.68 weight percent of a first surfactant, 0.23 weight percent of a second surfactant, 0.11 weight percent of a first amine catalyst, 0.11 weight percent of a second amine catalyst, 5.94 weight percent of a first polyether polyol, 8.90 weight percent of a second polyether polyol and 50 weight percent of the PU prepolymer.

11. The resin as claimed in claim 1, wherein the aqueous emulsion resin used as foaming materials includes 14.1 weight percent of the aqueous emulsion polymer, 21.2 weight percent of a first surfactant, 0.21 weight percent of a second surfactant, 0.21 weight percent of a first amine catalyst, 0.21 weight percent of a second amine catalyst, 14.1 weight percent of the polyether polyol and 50 weight percent of the PU prepolymer.

* * * * *